United States Patent
Storozuk et al.

(10) Patent No.: US 11,448,254 B2
(45) Date of Patent: Sep. 20, 2022

(54) RETAINED SELF-ALIGNING WASHER AND NUT ASSEMBLY AND METHOD FOR FABRICATION BY ADDITIVE MANUFACTURING

(71) Applicant: The Boeing Company, Chicago, IL (US)

(72) Inventors: Marc Storozuk, Winnipeg (CA); Richard W. Aston, Brea, CA (US)

(73) Assignee: The Boeing Company, Chicago, IL (US)

( * ) Notice: Subject to any disclaimer, the term of this patent is extended or adjusted under 35 U.S.C. 154(b) by 914 days.

(21) Appl. No.: 15/993,867

(22) Filed: May 31, 2018

(65) Prior Publication Data

US 2019/0368533 A1 Dec. 5, 2019

(51) Int. Cl.
*F16B 43/02* (2006.01)
*B33Y 10/00* (2015.01)
*B33Y 80/00* (2015.01)

(52) U.S. Cl.
CPC ............. *F16B 43/02* (2013.01); *B33Y 10/00* (2014.12); *B33Y 80/00* (2014.12)

(58) Field of Classification Search
CPC ..................................... F16B 43/02
USPC ........................................ 411/537
See application file for complete search history.

(56) References Cited

U.S. PATENT DOCUMENTS

| | | | | |
|---|---|---|---|---|
| 2,384,953 A | * | 9/1945 | Miller | F16B 39/36 411/237 |
| 3,135,154 A | * | 6/1964 | Zenzic | F16B 31/028 411/12 |
| 3,334,536 A | * | 8/1967 | Armstrong | F42B 3/006 411/434 |
| 3,352,341 A | * | 11/1967 | Schertz | F16B 37/0864 411/270 |
| 3,422,721 A | | 1/1969 | Yonkers | |
| 3,606,357 A | | 9/1971 | Yonkers | |
| 3,765,078 A | * | 10/1973 | Gulistan | F16B 37/044 29/432 |

(Continued)

FOREIGN PATENT DOCUMENTS

| | | |
|---|---|---|
| CN | 1886598 A | 12/2006 |
| CN | 204591947 U | 8/2015 |

(Continued)

OTHER PUBLICATIONS http://www.lisi-aerospace.com/products/fasteners/internally-threaded/self-aligning-nut/Pages/default.aspx.
http://catalog.arconicfastenersandrings.com/item/wrenchable-nuts/ut-12-point-self-aligning-light-weight-450-f-nbs-2/dho-55-7se.
https://www.carrlane.com/en-us/product/threaded-inserts/cast-inserts.

*Primary Examiner* — Gary W Estremsky
(74) *Attorney, Agent, or Firm* — Felix L. Fischer

(57) ABSTRACT

A washer and retained nut assembly has a washer with a retaining flange and a positioning cavity and a nut received in the washer. The nut has a shoulder received in the positioning cavity with a top surface of the shoulder engaging a lower surface of the retaining flange in a loose condition of the washer and nut. The nut further has an engagement surface contacting a receiving surface in the washer in an engaged position of the washer and nut. The nut further has a peripheral surface engaging a blocking surface in the washer with the nut and washer in a maximum offset angle orientation between the washer and nut in the engaged position.

22 Claims, 8 Drawing Sheets

(56) References Cited

U.S. PATENT DOCUMENTS

| | | | | |
|---|---|---|---|---|
| 4,479,747 A | * | 10/1984 | Pagel | F16B 39/26 411/427 |
| 4,830,557 A | | 5/1989 | Harris et al. | |
| 5,037,258 A | * | 8/1991 | Heurteux | F16B 37/047 411/104 |
| 5,326,206 A | * | 7/1994 | Moore | F16B 5/0208 29/525.02 |
| 7,101,135 B2 | * | 9/2006 | Hassed | F16B 5/0216 411/111 |
| 7,306,604 B2 | * | 12/2007 | Carli | A61B 17/8033 411/222 |
| 8,814,748 B2 | * | 8/2014 | Osterlanger | F16H 25/2003 475/333 |
| 8,881,478 B2 | * | 11/2014 | Gray | E04B 1/26 52/223.14 |
| 2003/0133771 A1 | * | 7/2003 | Dohm | F16B 43/00 411/533 |
| 2004/0234358 A1 | * | 11/2004 | Genick | F16B 43/00 411/533 |

FOREIGN PATENT DOCUMENTS

| | | |
|---|---|---|
| CN | 206770370 U | 12/2017 |
| JP | 07190033 H | 7/1995 |
| JP | 2015193064 A | 11/2015 |
| WO | 1998006917 A1 | 2/1998 |

\* cited by examiner

RETAINED SELF-ALIGNING WASHER AND NUT ASSEMBLY AND METHOD FOR FABRICATION BY ADDITIVE MANUFACTURING

BACKGROUND INFORMATION

Field

Implementations shown in the disclosure relate generally to nut and washer assemblies and more particularly to a nut with retained washer having alignment surfaces for offset angle assembly.

Background

Nut and washer combinations are used in numerous manufacturing operations for various products. In large scale complex manufacturing, for example in the manufacture of commercial aircraft, thousands of such nut and washer combinations may be used. Manual alignment of separate nuts and washers takes significant time and either item may be mishandled or lost. In addition, fastener elements received into the washer and nut may be inserted through structural holes that are slightly offset angle and accommodation of that offset angle alignment is required. Prior art solutions for installation of fasteners when the surface under the fastener head or nut is not nominally perpendicular to the axis of the hole within a certain value include using a concave washer and a nut with a convex base; using a concave and convex washer set beneath a standard nut; or using a tapered filler beneath a standard nut. These approaches require that the installer procure and handle multiple fitted individual components. This can be costly, time consuming, and awkward depending on the size of the parts. Additionally, when a tapered filler or other similar part is added, it requires the additional step of drilling a hole through the filler to accommodate the fastener. An alternative approach is spot-facing the surface that is not perpendicular to the hole axis in which a certain area of the surface (a "spot") is machined ("faced") to a smooth, flat surface perpendicular to the hole. Spot facing requires additional tooling and may be time consuming during assembly processing.

SUMMARY

Exemplary implementations provide a washer and retained nut assembly with a washer having a retaining flange and a positioning cavity and a nut received in the washer. The nut has a shoulder received in the positioning cavity with a top surface of the shoulder engaging a lower surface of the retaining flange in a loose condition of the washer and nut. The nut further has an engagement surface contacting a receiving surface in the washer in an engaged position of the washer and nut. The nut further has a peripheral surface engaging a blocking surface in the washer with the nut and washer in a maximum offset angle orientation between the washer and nut in the engaged position.

The exemplary implementations additionally provide a fastening system with offset angle capability having a fastener receivable in a hole in a structure wherein the hole has an offset angle relative to a surface of the structure. A nut and washer assembly has a washer with a bottom surface received on the surface of the structure and an aperture to receive the fastener and a nut received in the washer and having a bore to receive the fastener. The washer has a retaining flange and a positioning cavity and a nut received in the washer. The nut has a shoulder received in the positioning cavity with a top surface of the shoulder engaging a lower surface of the retaining flange in a loose condition of the washer and nut. The nut further has an engagement surface contacting a receiving surface in the washer in an engaged position of the washer and nut. The nut further has a peripheral surface engaging a blocking surface in the washer with the nut and washer in a maximum offset angle orientation between the washer and nut in the engaged position.

The exemplary implementations allow a method for producing a washer and nut assembly wherein microlayers are printed using a metal powder and binder formulation for a washer and nut structure. A ceramic intermediary is laid down in void locations forming an aperture and positioning cavity in the washer and a relief and bore in the nut and a separation between a retaining flange in the washer and a body of the nut at predetermined locations in the printing of each microlayer. The binder is cured to solidify a metal matrix in the structure of the washer and nut. The metal matrix is then sintered. The binder is removed by solvent wash or heat vaporization. The remaining metal matrix is then consolidated. The ceramic intermediary is vaporized in an oven cure leaving the consolidated metal washer and retained nut with an intervening positioning cavity.

The exemplary implementations allow a method for use of a self-retaining washer and nut assembly manufactured by an additive manufacturing process to form a nut and a washer. An upper surface of a shoulder on the nut is engaged by a retaining flange on the washer and the nut is retained in a positioning cavity for manipulating of the washer and captive nut. A fastener is engaged in the nut through a hole in a structure, the hole offset by an angle from a neutral axis. An engagement surface on the nut remains in spherically concentric contact with a receiving surface on the washer while a bottom surface of the washer remains in parallel contact with the surface of the structure. To assure an effective arc length for a minimum contact portion of the receiving surface on the washer and complimentary contact portion on the engagement surface of the nut, a blocking surface in the positioning cavity contacts a peripheral surface of the nut with the nut at a predetermined blocking angle relative to the washer.

BRIEF DESCRIPTION OF THE DRAWINGS

The features, functions, and advantages that have been discussed can be achieved independently in various implementations or may be combined in yet other implementations further details of which can be seen with reference to the following description and drawings.

DETAILED DESCRIPTION

The exemplary implementations described herein provide a washer and nut having spherical engagement surfaces to allow offset angle positioning with respect to a fastener while maintaining full circumferential contact with the washer on the joined structure surface. The washer incorporates a retaining flange engaging a shoulder on the nut which prevents separation of the nut from the washer. The retention interface geometry provides acceptance of an offset angle fastener into the nut at a range of angles up to a maximum angle at which a contact portion of a peripheral surface on the nut engages a blocking surface on the washer and a contact portion of the shoulder on the nut engages the retaining flange preventing further angular rotation. Additive manufacturing of the washer and nut simultaneously provides the capability for optimizing the retention interface geometry with consistent part dimensions and quality while assuring that the nut and washer remain together from manufacture through assembly.

Figure 1A:
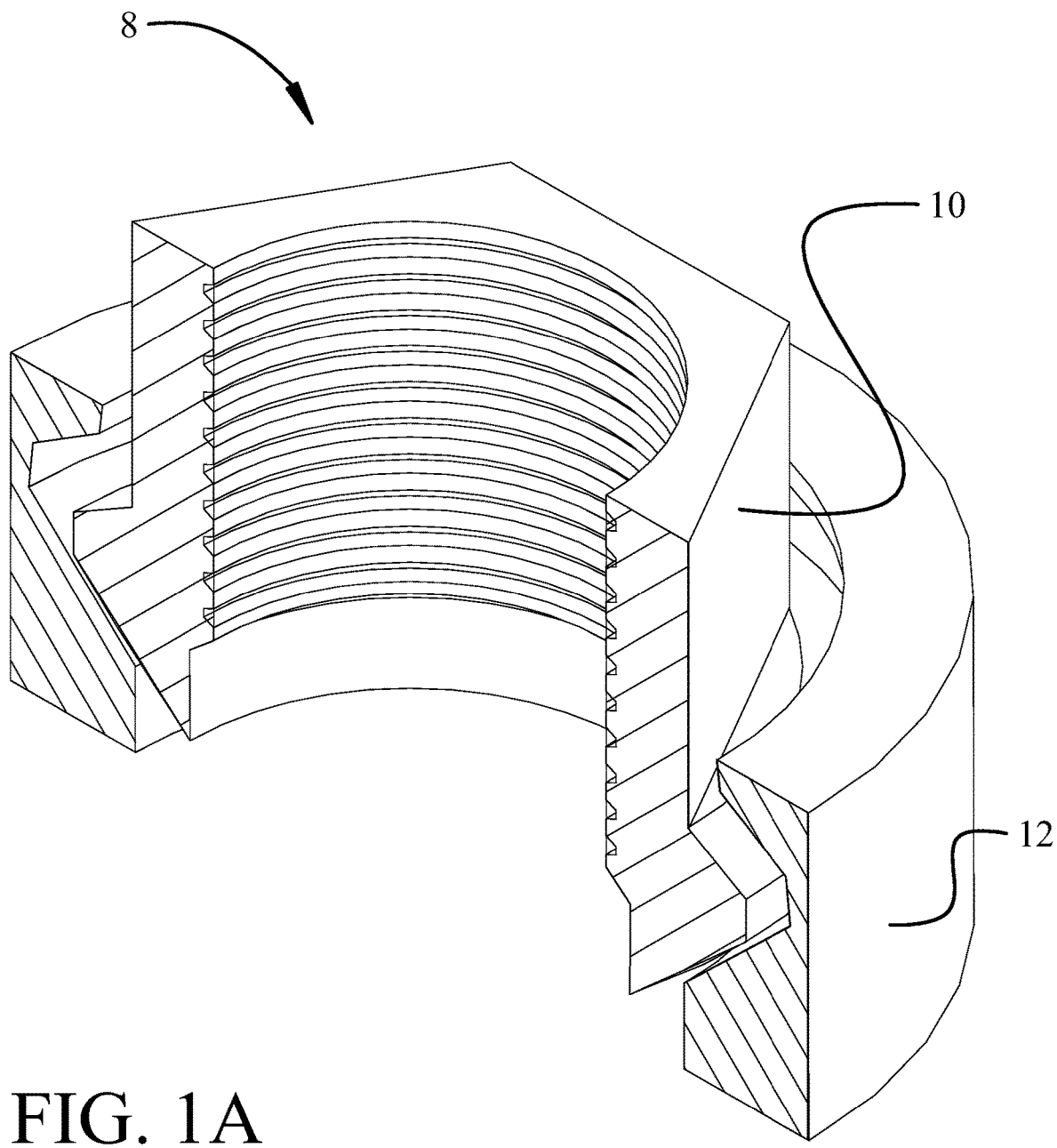
FIG. 1A is a representative isometric section view of an exemplary implementation of a nut and washer in a neutral position for engagement of a fastener.
Figure 1B:
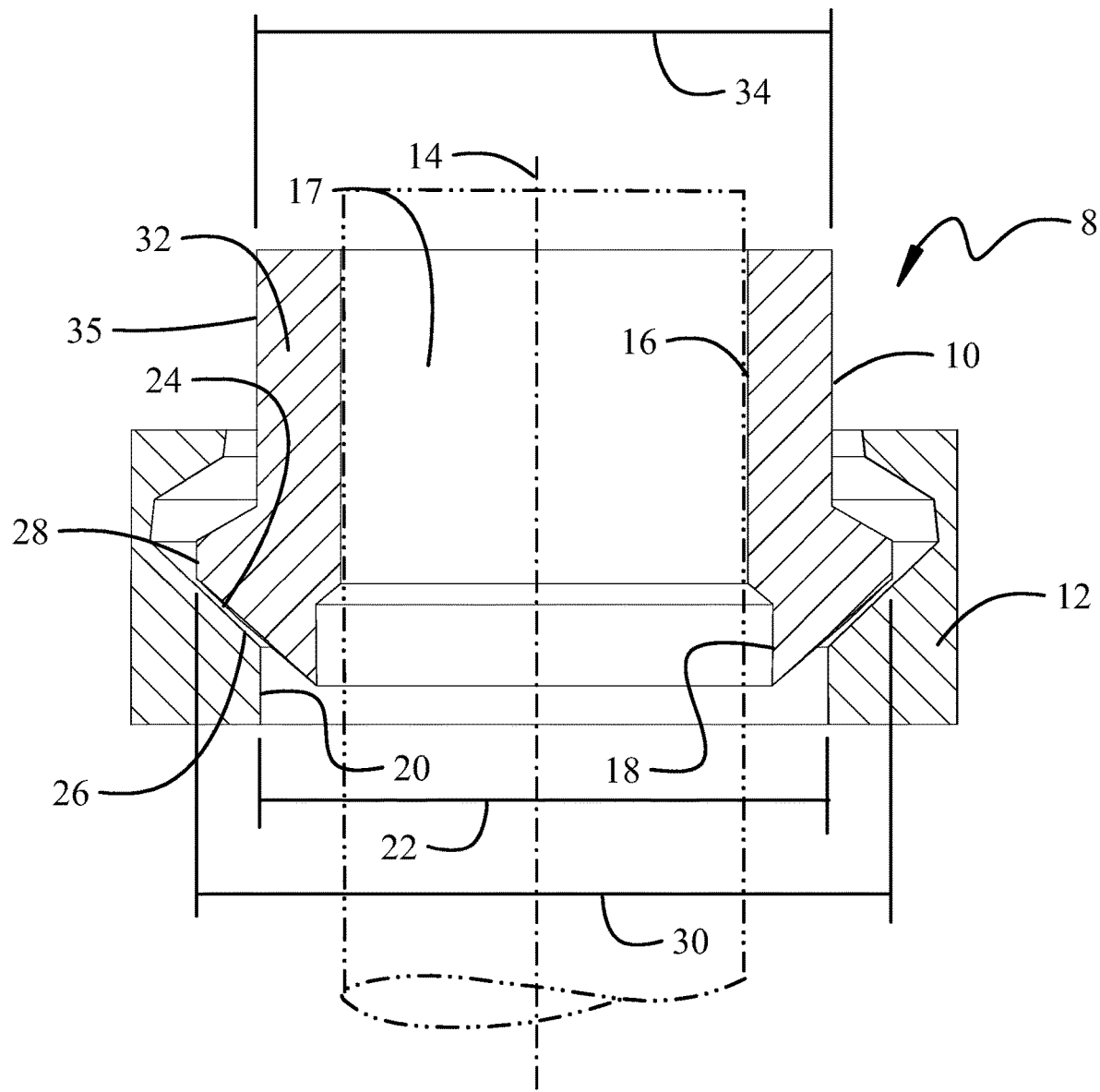
FIG. 1B is a side section view of the exemplary implementation of FIG. 1A (threads removed for clarity)

Referring to the drawings, FIG. 1A shows in a sectioned view an exemplary implementation of a washer and retained nut assembly 8 with a nut 10 in a neutral engagement position with a washer 12. As seen in FIG. 1B (threads removed for clarity) the nut 10 and washer 12 are in alignment along a neutral axis 14. The nut 10 has a bore 16 which is threaded to accept a threaded fastener 17 (shown in phantom). An engagement relief 18 is provided to assist in alignment of the fastener into the nut for assembly. Washer 12 has a receiving aperture 20 with a diameter 22 sufficient for accepting an offset angle fastener as will be described in greater detail subsequently. In a neutral alignment position as shown in FIGS. 1A and 1B, the receiving aperture 20 and bore 16 are concentrically aligned with neutral axis 14. The nut 10 has an engagement surface 24 which contacts a receiving surface 26 in the washer 12 in an engaged condition. The engagement surface 24 and receiving surface 26 have concentric spherical profiles to allow smooth engagement at any relative angle orientation between the nut 10 and washer 12, from a neutral orientation to a maximum offset angle orientation, while maintaining optimum alignment of the nut 10 and washer 12. The nut 10 has a peripheral surface 28 with an outer diameter 30 and body 32 with a maximum body diameter 34 at a periphery 35.

Figure 2:
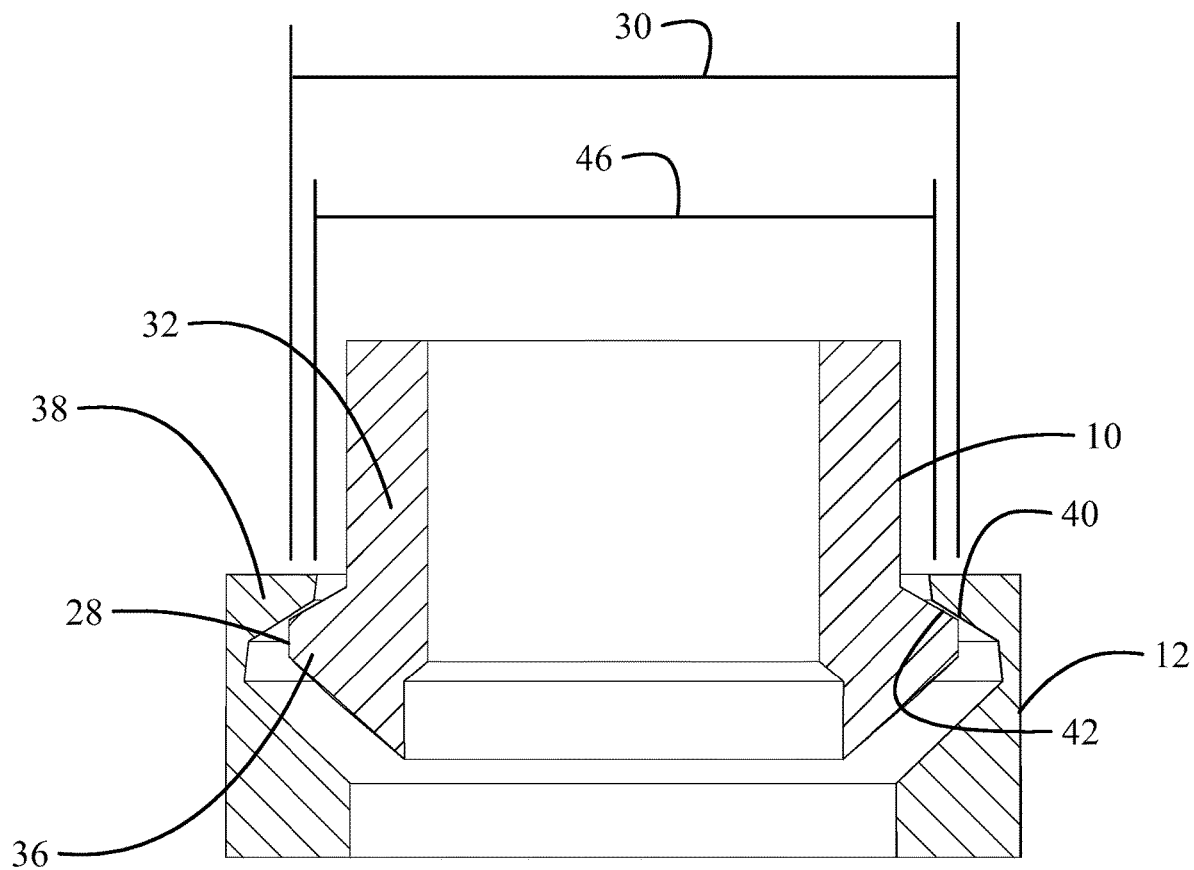
FIG. 2 is a representative section view of the exemplary implementation with the nut elevated and retained by the washer.

FIG. 2 demonstrates a retained position of the nut 10 and washer 12. The nut 10 has a shoulder 36 extending from the body 32 to a peripheral surface 28. The washer 12 has a retaining flange 38 with a lower surface 40 that is adapted to engage an upper surface 42 of the shoulder 36 on the nut 10. The washer 12 has a circumferential positioning cavity 44 whereby the nut 10 is loosely received in the washer 12 to accommodate offset angle positioning of the nut 10 as will be described in greater detail subsequently. The retaining flange 38 has an inner diameter 46 which assures engagement of the upper surface 42 of the shoulder 36 on the lower surface 40 of the retaining flange 38 to retain the nut 10 within the washer 12 in a loose condition. In exemplary implementations inner diameter 46 is a range of 85% to 90% of outer diameter 30.

Figure 3:
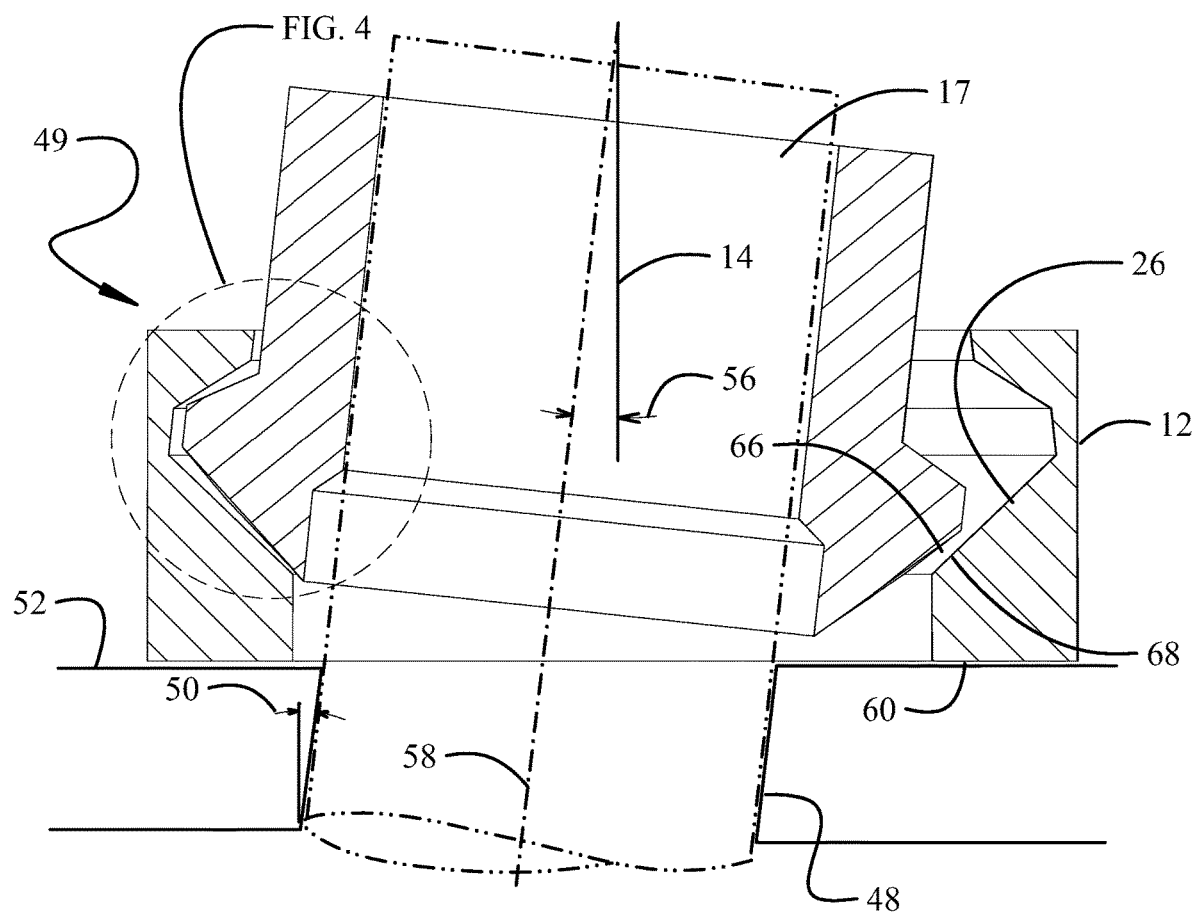
FIG. 3 is a representative section view of the nut in a maximum off alignment rotated position.
Figure 4A:
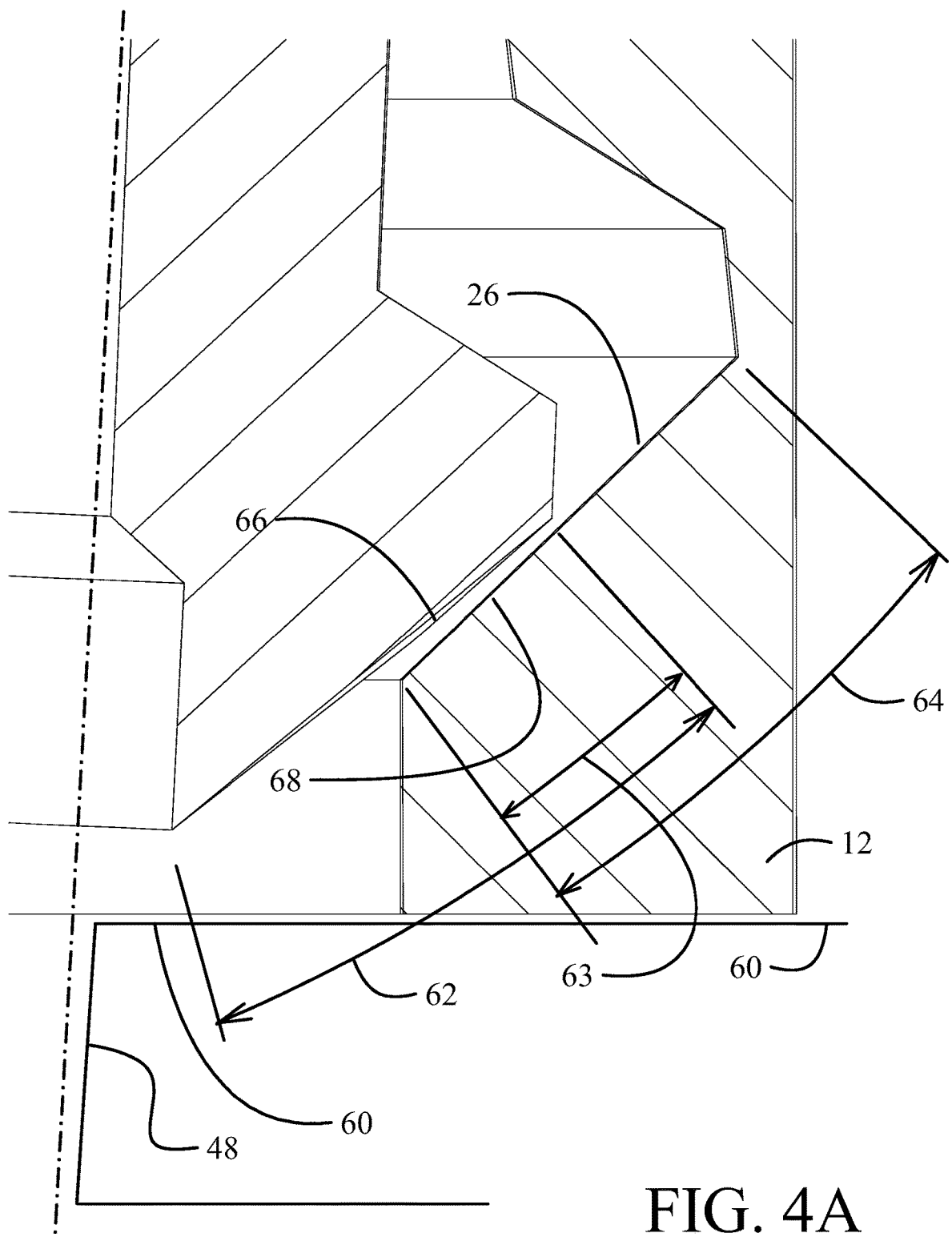
FIG. 4A is a detailed view of the engagement profiles for the nut and washer for off alignment limitation.

The ability for the nut 10, as retained in the washer 12, to receive a fastener 17 which is engaged through a hole 48 which is offset by an angle from the neutral axis 14 provides a complete fastening system 49 as shown in FIG. 3 (surfaces shown offset for clarity). The angle 50 of the hole relative to an orthogonal alignment relative to a surface 52 of a structure 54 being fastened induces a complimentary offset angle 56 between the fastener 17 and the neutral axis 14. The nut 10 is rotatable relative to the washer 12 to concentrically align with the fastener 17 along axis 58. Engagement surface 24 remains in spherically concentric contact with receiving surface 26 while a bottom surface 60 of the washer 12 remains in parallel contact with the surface 52 of the structure 54. At a maximum offset angle orientation as shown in FIG. 4A, an arc length 62 of engagement surface 24 and a receiving arc length 64 of receiving surface 26 are sufficient to allow a minimum contact portion 66 of engagement surface 24 to remain received on a complimentary contact portion 68 of receiving surface 26 with a minimum contact arc length 63. The nut 10 and washer 12 thereby remain fully engaged to maintain equal pressure on the circumference of the bottom surface 60 of washer 12.

Figure 4B:
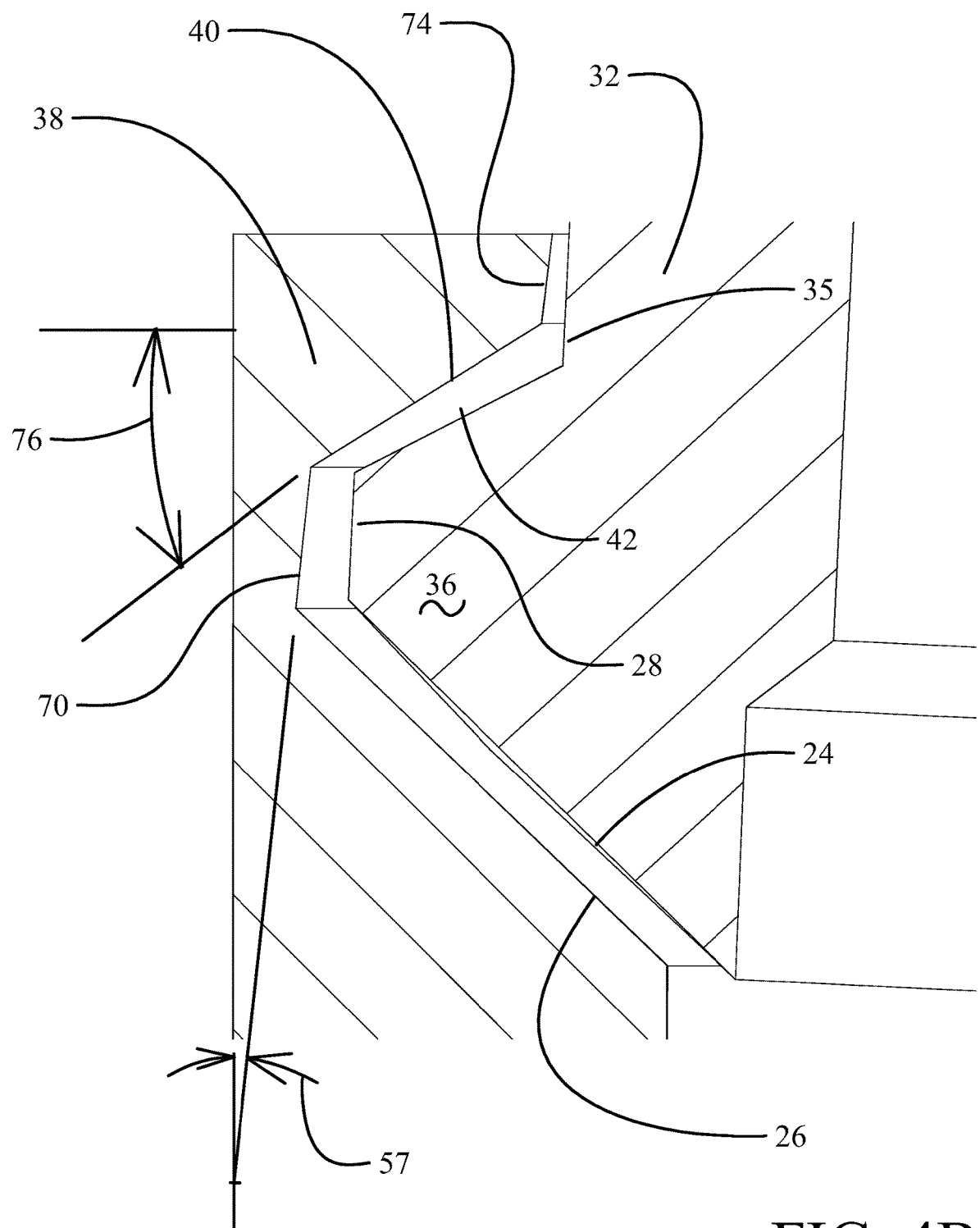
FIG. 4B is a detailed view of the blocking surface of the washer and the peripheral surface of the nut for limitation of the off alignment angle.

To assure an effective arc length for the minimum contact portion 66 and complimentary contact portion 68, a blocking surface 70 in the positioning cavity 44 contacts the peripheral surface 28 of the nut 10 with the nut 10 at a predetermined blocking angle 57 relative to the washer 12 as seen in FIG. 4B (contacting surfaces are shown slightly offset for clarity). For the exemplary implementation, a 7° maximum offset angle 56 is allowed which is mirrored in the predetermined blocking angle 57 and relative angle 72 (for a nut 10 having a body periphery 35 parallel to the neutral axis in the neutral position). In the exemplary implementation, peripheral surface 28 is parallel to neutral axis 14 in the neutral engagement position. Blocking surface 70 may be angled at the maximum offset angle 56 to enable a flush engagement of the blocking surface 70 and peripheral surface 28 with maximum offset angle orientation between the nut 10 and washer 12. Engagement surface 24 extends to the peripheral surface 28 and receiving surface 26 extends to the blocking surface 70 for continuous contact in the maximum offset angle orientation between the washer 12 and nut 10. In addition or alternatively, inner surface 74 of retaining flange 38 may contact the periphery 35 of the body 32 to further limit the maximum offset angle orientation. As with the blocking surface and peripheral surface, the inner surface 74 may be angled at the relative angle 72 with regard to the neutral axis 14 for a flush contact with the periphery 35. Angling of the blocking surface 70 and inner surface 74 for flush contact mitigates potential stress risers at the maximum offset angle orientation that would occur with corner contact.

Additionally, the lower surface 40 of retaining flange 38 may be angled for engagement of upper surface 42 of the shoulder 36 in the maximum offset angle orientation. A relief angle 76 may be established for lower surface 40 and upper surface 42 to optimize stresses in the retaining flange 38 and shoulder 36 and reduce lifting tendency in the off-loaded portion of the periphery of the washer 12 at the maximum offset angle inducing a flush contact of the lower surface 40 and upper surface 42 during engagement of the washer 12 and nut 10 at the maximum offset angle. The relief angle 76 is additionally established based on the unsupported printing capability of the additive manufacturing process employed for simultaneous fabrication of the nut and washer as described in greater detail subsequently For exemplary implementations a range of 30° to 35° for the relief angle 76 is employed.

Figure 5:
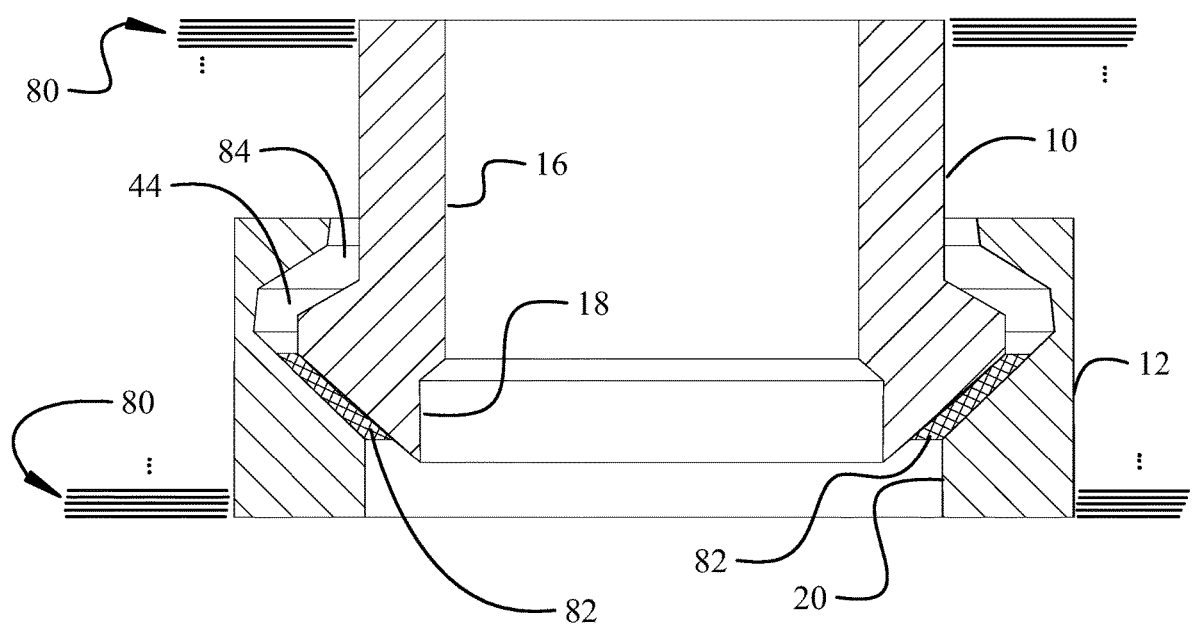
FIG. 5 is a representative section view of a an intermediary nut and washer assembly during a first exemplary additive manufacturing process; and, FIG. 6 is a flow chart showing a method for manufacture of a washer and nut employing the disclosed implementations with an additive manufacturing process.
Figure 6:
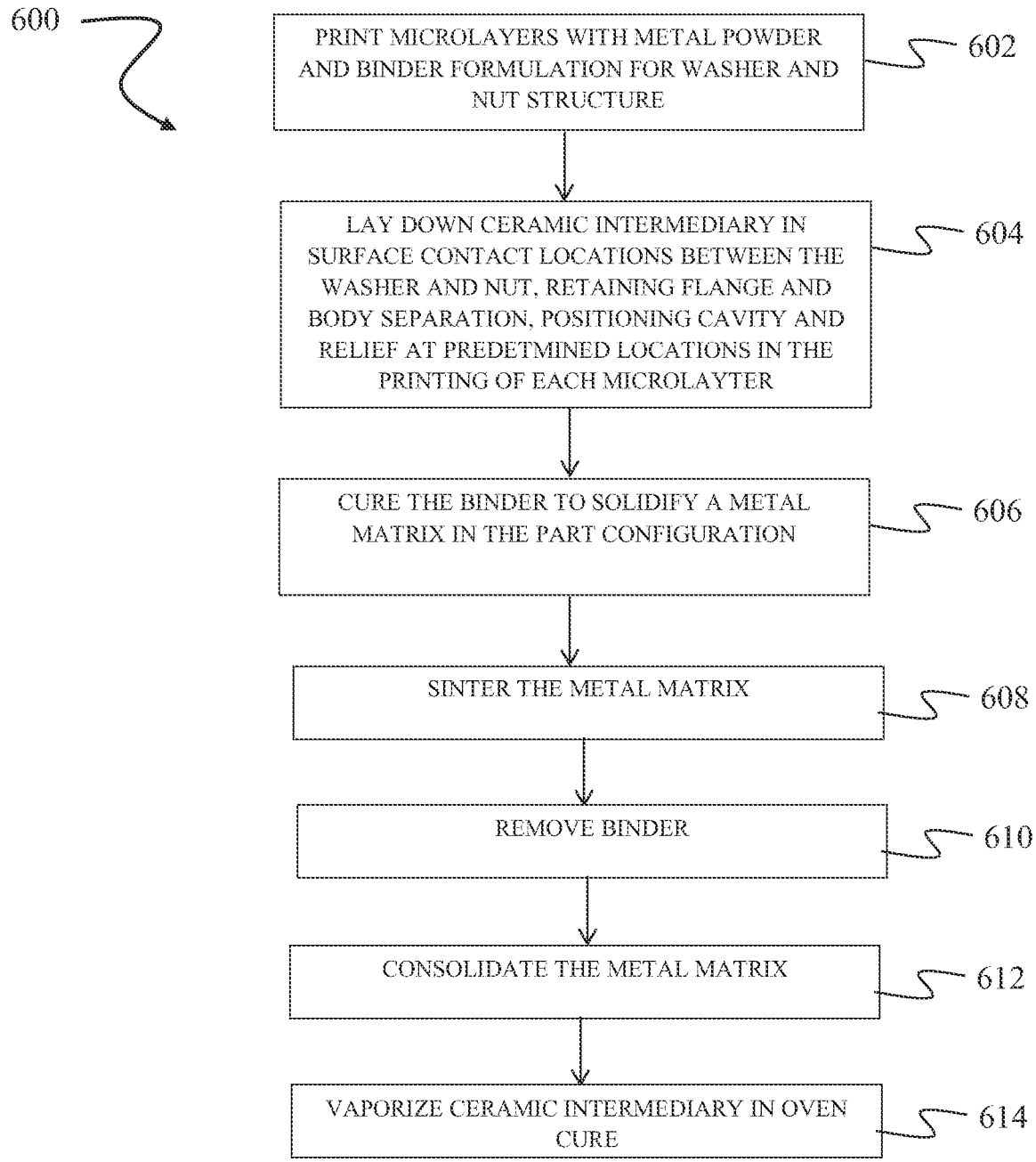

The exemplary implementations described herein are fabricated using an additive manufacturing process as described with respect to FIGS. 5 and 6. A modified Metal Injection Molding (MIM) process 600 is employed wherein microlayers 80 are printed using a metal powder and binder formulation, the feedstock mix, for the washer 12 and nut 10 structure, step 602. A ceramic intermediary 82, shown exaggerated in thickness for clarity, is laid down at intersection surfaces such as engagement surface 24 and receiving surface 26 in the printing of each microlayer, step 604. Layer printing of the feedstock mix and ceramic intermediately provides dimensional definition of the contact surfaces as previously described including the engagement surface 24, receiving surface 26, peripheral surface 28, retaining flange bottom surface 40 and shoulder top surface 42, retaining flange inner surface 74, nut body periphery 35 and blocking surface 70. The printing of the layers is accomplished with the retaining flange bottom surface 40 and shoulder top surface 42 having the previously described relief angle of less than 35°. While not shown, ceramic intermediary may be employed to dimensionally stabilize the threaded bore 16. The binder is then cured to solidify a metal matrix in the part configuration, step 606. The metal matrix is then sintered, step 608 and the binder is removed, step 610, either by solvent wash or heat vaporization. The remaining metal matrix is then consolidated, step 612. The ceramic intermediary is then vaporized in an oven cure, step 614 leaving the consolidated metal washer 12 and retained nut 10 with the intervening positioning cavity 44. An exemplary process for performing the MIMM process is a polyjet printing technology available from Desktop Metal, Inc., Burlington, Mass.

The implementation as described further provides a method for use of an additively manufactured self-retaining washer and nut assembly. A washer 12 and a captive nut 14 are manipulated with an upper surface 42 of a shoulder 36 on the nut engaged by a retaining flange 38 on the washer and the nut is retained in a positioning cavity 44. A fastener 17 is engaged in the nut through a hole 48 in a structure 54 wherein the hole is offset by an angle from a neutral axis 14. An engagement surface 24 on the nut is maintained in spherically concentric contact with a receiving surface 26 on the washer while a bottom surface 60 of the washer remains in parallel contact with the surface 52 of the structure. A blocking surface 70 in the positioning cavity is contacted with a peripheral surface 28 of the nut with the nut at a predetermined blocking angle 57 relative to the washer. Contacting the blocking surface assures an effective arc length for a minimum contact portion 66 of the engagement surface of the nut and complimentary contact portion 66 on the receiving surface on the washer. The blocking surface is engaged at a maximum offset angle 56 to enable a flush engagement of the blocking surface and peripheral surface with maximum offset angle orientation between the nut and washer. An inner surface 47 of the retaining flange 38 is contacted at a periphery 35 of a body 32 of the nut to further limit the maximum offset angle orientation.

Having now described various implementations in detail as required by the patent statutes, those skilled in the art will recognize modifications and substitutions to the specific implementations disclosed herein. Such modifications are within the scope and intent of the present invention as defined in the following claims.

What is claimed is:

1. A washer and retained nut assembly comprising:
   a washer having a retaining flange and a positioning cavity, said retaining flange having an inner diameter;
   a nut received in the washer, said nut having a cylindrical body with a maximum body diameter at a periphery, said maximum body diameter less than the inner diameter of the retaining flange whereby the periphery of the body extends through the inner diameter, and said body having a shoulder extending from the cylindrical body to a peripheral surface having an outer diameter, the outer diameter larger than the inner diameter of the retaining flange, the shoulder retained in the positioning cavity, a top surface of the shoulder engaging a lower surface of the retaining flange in a loose condition of the washer and nut, the inner diameter of the retaining flange being less than the outer diameter of the shoulder assuring engagement of the shoulder with the retaining flange to retain the nut within the washer in the loose condition, said nut further having an engagement surface, said engagement surface contacting a receiving surface in the washer in an engaged position of the washer and nut wherein the engagement surface and the receiving surface have spherical profiles, said peripheral surface engaging a blocking surface in the washer with the nut and washer in a maximum offset angle orientation between the washer and nut in the engaged position.

2. The washer and retainer nut assembly as defined in claim 1 wherein a blocking surface in the washer has a predetermined blocking angle with respect to a neutral axis of the washer and nut, said predetermined blocking angle equal to a maximum offset angle for engagement of the washer and nut.

3. The washer and retainer nut assembly as defined in claim 2 wherein upon engagement of the washer and nut at the maximum offset angle a minimum contact arc length is present between the contacting engagement surface and receiving surface providing a minimum contact portion on the engagement surface and a complimentary contact portion on the receiving surface.

4. The washer and retainer nut assembly as defined in claim 1 wherein an inner surface of the retaining flange contacts a periphery of a body of the nut, said inner surface having a relative angle with respect to a neutral axis of the washer and nut for a flush contact with the periphery in a maximum offset angle engagement between the washer and nut.

5. The washer and retainer nut assembly as defined in claim 1 wherein a lower surface of the retaining flange and an upper surface of the shoulder have a relief angle inducing flush contact upon engagement of the washer and nut in the maximum offset angle condition.

6. The washer and retained nut assembly as defined in claim 5 wherein the relief angle is less than 35°.

7. The washer and retained nut assembly as defined in claim 1 wherein the inner diameter is a range of 85% to 90% of the outer diameter.

8. A fastening system with offset angle capability, said system comprising:
   a fastener receivable in a hole in a structure, said hole having an offset angle relative to a surface of the structure;
   an additively manufactured nut and washer assembly having
   a washer with a bottom surface received on the surface of the structure and an aperture to receive the fastener, said washer a having a retaining flange and a positioning cavity;
   a nut received in the washer and having a bore to receive said fastener, said nut having a shoulder received in the positioning cavity, a top surface of the shoulder engaging a lower surface of the retaining flange in a loose condition of the washer and nut, said nut further having an engagement surface and said washer having a receiving surface, a removable ceramic intermediary in contact locations between the receiving surface on the washer and the engagement surface of the nut during additive manufacturing, said engagement surface contacting the receiving surface in the washer in an engaged position of the washer and nut over a range of offset angle orientation after completion of additive manufacturing, said nut further having a peripheral surface, said peripheral surface engaging a blocking surface in the washer with the nut and washer in a maximum offset angle orientation between the washer an nut in the engaged position.

9. The fastening system as defined in claim 8 wherein the engagement surface and the receiving surface have spherical profiles.

10. The fastening system as defined in claim 9 wherein a blocking surface in the washer has a predetermined blocking angle with respect to a neutral axis of the washer and nut, said predetermined blocking angle equal to a maximum offset angle for engagement of the washer and nut.

11. The fastening system as defined in claim 8 wherein a lower surface of the retaining flange and an upper surface of the shoulder have a relief angle three dimensionally printed in an additive manufacturing process to induce flush contact upon engagement of the washer and nut in the maximum offset angle condition.

12. The fastening system as defined in claim 11 wherein the relief angle is less than 35°.

13. The fastening system as defined in claim 11 wherein the retaining flange has an inner diameter assuring engagement of an outer diameter of the shoulder to retain the nut within the washer in a loose condition.

14. The fastening system as defined in claim 13 wherein the inner diameter is a range of 85% to 90% of the outer diameter.

15. A method for producing a washer and nut assembly, said method comprising:
    printing microlayers using a metal powder and binder formulation for a washer and a nut, said nut retained within said washer wherein the washer has a retaining flange and a positioning cavity and the nut has a body with an extending shoulder, the shoulder received in the positioning cavity, a top surface of the shoulder engaging a lower surface of the retaining flange in a loose condition of the washer and nut, the retaining flange having an inner diameter assuring engagement of an outer diameter of the shoulder to retain the nut within the washer in the loose condition, said nut further having an engagement surface, said engagement surface contacting a receiving surface in the washer in an engaged position of the washer and nut, said nut further having a peripheral surface, said peripheral surface engaging a blocking surface in the washer with the nut and washer in a maximum offset angle orientation between the washer and nut in the engaged position;
    laying down a ceramic intermediary in contact locations between the receiving surface on the washer and the engagement surface of the nut at predetermined locations in the printing of each microlayer;
    curing the binder to solidify a metal matrix in the structure of the washer and nut;
    sintering the metal matrix;
    removing the binder by solvent wash or heat vaporization;
    consolidating the remaining metal matrix; and
    vaporizing the ceramic intermediary in an oven cure leaving the consolidated metal washer and retained nut with the positioning cavity.

16. The method as defined in claim 15 wherein the steps of printing microlayers of the metal powder and binder formulation and laying down the ceramic intermediately provide dimensional definition of contact surfaces in the washer and nut including the engagement surface, the receiving surface, a peripheral surface, a retaining flange bottom surface and a shoulder top surface, a retaining flange inner surface, a nut body periphery and a blocking surface.

17. The method as defined claim 15 wherein the engagement surface and the receiving surface have spherical profiles.

18. The method as defined claim 16 wherein the blocking surface in the washer has a predetermined blocking angle with respect to a neutral axis of the washer and nut, said predetermined blocking angle equal to a maximum offset angle for engagement of the washer and nut.

19. A method for use of an additively manufactured self-retaining washer and nut assembly comprising:
    manipulating a washer having a retaining flange and a positioning cavity, said retaining flange having an inner diameter, and a captive nut having a cylindrical body with a maximum body diameter at a periphery, said maximum body diameter less than the inner diameter of the retaining flange whereby the periphery of the cylindrical body extends through the inner diameter, and said body having a shoulder extending from the cylindrical body to a peripheral surface having an outer diameter, the outer diameter larger than the inner diameter of the retaining flange, with an upper surface of the shoulder engaged by the retaining flange on the washer, a top surface of the shoulder engaging a lower surface of the retaining flange in a loose condition of the washer and nut, the inner diameter of the retaining flange being less than the outer diameter of the shoulder assuring engagement of the shoulder with the retaining flange to retain the nut within the washer in the loose condition, said nut further having an engagement surface, said engagement surface contacting a receiving surface in the washer in an engaged position of the washer and nut, wherein the engagement surface and the receiving surface have spherical profiles, said peripheral surface of the nut engaging a blocking surface in the washer with the nut and washer in a maximum offset angle orientation between the washer and nut in the engaged position;
    retaining the nut in a positioning cavity;
    engaging a fastener in the nut through a hole in a structure, the hole offset by an angle from a neutral axis;
    maintaining the engagement surface on the nut in spherically concentric contact with the receiving surface on the washer while a bottom surface of the washer remains in parallel contact with the surface of the structure; and
    contacting the blocking surface in the positioning cavity with the peripheral surface of the nut with the nut at a predetermined blocking angle relative to the washer.

20. The method as defined in claim 19 wherein contacting a blocking surface further comprises assuring an effective arc length for a minimum contact portion on the engagement surface of the nut and complimentary contact portion of the receiving surface on the washer.

21. The method as defined in claim 19 further comprising engaging the blocking surface at a maximum offset angle to enable a flush engagement of the blocking surface and peripheral surface with maximum offset angle orientation between the nut and washer.

22. The method as defined in claim 19 further comprising contacting an inner surface of the retaining flange at a periphery of a body of the nut to further limit the maximum offset angle orientation.

\* \* \* \* \*